United States Patent [19]
Sato

[11] Patent Number: 4,710,960
[45] Date of Patent: Dec. 1, 1987

[54] SPEECH-ADAPTIVE PREDICTIVE CODING SYSTEM HAVING REFLECTED BINARY ENCODER/DECODER

[75] Inventor: Toshifumi Sato, Tokyo, Japan

[73] Assignee: NEC Corporation, Tokyo, Japan

[21] Appl. No.: 581,750

[22] Filed: Feb. 21, 1984

[30] Foreign Application Priority Data

Feb. 21, 1983 [JP] Japan .................................. 58-26295

[51] Int. Cl.$^4$ .............................................. G10L 5/00
[52] U.S. Cl. ..................................................... 381/47
[58] Field of Search ..................................... 381/29–40, 381/46, 47, 51; 364/513.5; 375/26; 371/31, 39, 40, 41

[56] References Cited

U.S. PATENT DOCUMENTS

| | | | |
|---|---|---|---|
| 3,688,039 | 8/1972 | Ishiguro ................................. | 371/31 |
| 4,220,819 | 9/1980 | Atal ....................................... | 381/40 |
| 4,291,405 | 9/1981 | Jayant et al. .......................... | 371/31 |
| 4,301,329 | 11/1981 | Taguchi ................................. | 381/37 |
| 4,354,057 | 10/1982 | Atal ....................................... | 381/40 |
| 4,413,340 | 11/1983 | Odaka et al. .......................... | 371/39 |
| 4,419,657 | 12/1983 | Gagnon ....................... | 340/347 AD |
| 4,464,784 | 8/1984 | Agnello ................................. | 381/36 |
| 4,472,832 | 9/1984 | Atal et al. ............................. | 381/40 |
| 4,561,102 | 12/1985 | Prezas .................................. | 381/49 |

OTHER PUBLICATIONS

Atal, B. S. "Predictive Coding of Speech at Low Bit Rates" IEEE Transactions on Communications Com 40, No. 4, Apr. 1982.

Flangan, J. L. "Speech, Analysis Synthesis and Perception" Springer-Verlag, New York 1972.

Inose, Hiroshi "An Introduction to Digital Integrated Communications Systems" University of Tokyo Press, Tokyo, Japan 1979.

Primary Examiner—Emanuel S. Kemeny
Attorney, Agent, or Firm—Sughrue, Mion, Zinn, Macpeak, and Seas

[57] ABSTRACT

A speech predictive coding system produces a predicted residual sequence and parameter information representing predictor coefficients and residual power. The parameter information is encoded into reflected binary code and multiplexed with the predicted residual sequence for transmission to a receiver. At the receiver the multiplexed data is demultiplexed into a predicted residual sequence and reflected binary encoded parameter information. Burst errors in the multiplexed signal are detected at the receiver using a burst-energy detector, and when so detected cause a bit by bit substitution from a prior frame of the encoded parameter information into the present frame of the encoded parameter information. The encoded parameter information, with those substitutions as are necessary is decoded and used to generate the predictor coefficients and residual power for converting the predicted residual sequence into a reconstructed speech signal.

10 Claims, 6 Drawing Figures

SPEECH-ADAPTIVE PREDICTIVE CODING SYSTEM HAVING REFLECTED BINARY ENCODER/DECODER

BACKGROUND OF THE INVENTION

The present invention relates to a high-efficiency speech encoding/decoding apparatus for use in a pulse code-modulation (PCM) comnunications system, and more particularly to a burst error correction circuit for speech encoding/decoding apparatus using a speech-adaptive predictive coding system.

For the prevention of speech quality deterioration owing to errors in information bit sequences in this sort of high-efficiency speech encoding/decoding apparatus, typically the following two methods are known.

The first uses error correction codes. This method, though effective against random errors and short burst errors, has to use codes of low efficiency (the number of information bits/block-length) when used on a transmission path where great fluctuations occur over time and random errors and long burst errors also arise, such as in mobile communication. This results in a greater number of redundant bits with a diminishing effect on the advantage of using a high-efficiency speech coding system.

Figure 1:
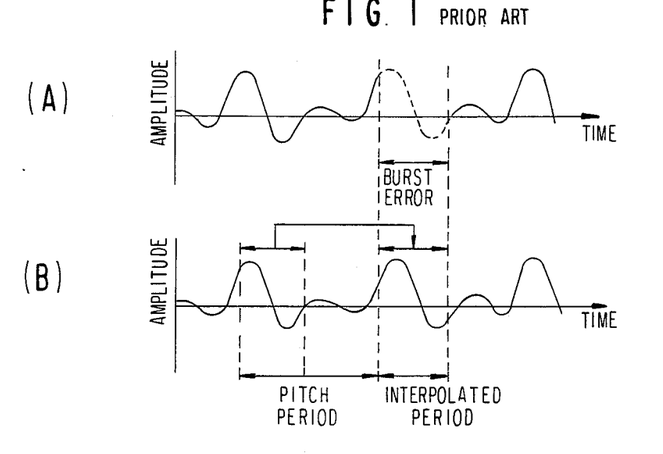
FIG. 1 are waveform diagrams for describing a waveform interpolation method of the prior art, which has been described earlier.

The second relies on waveform interpolation. Utilizing the quasi-periodic nature of the waveforms of speech (especially voice), this method interpolates the waveform prior by one pitch period (hereinafter referred to as waveform interpolation) when detecting a burst error, which can be detected with comparative ease (See FIGS. 1(A) and 1(B).) This second method is used for analog speech transmission or the transmission of speech waveforms alone, such as in a PCM communications system. However, the method has to be improved if it is to be applied to an encoding apparatus, such as an adaptive predictive encoding system in which parameter information also has to be transmitted. It also requires the detection of the pitch period and accordingly a circuit of greater dimensions.

Another method has been contemplated by the inventor herein to improve the second technique. It utilizes the time-correlation of speech (the relative slowness of the fluctuations of formant and sound intensity) to substitute the prior bits for parameter information as well. This method will be hereinafter referred to as word-by-word parameter interpolation.

This interpolation method replaces all the bits constituting a parameter with the bits of the prior frame even if only a few of the bits are erroneous. Therefore, the frequency of parameter replacements (hereinafter referred to as the parameter interpolation rate or simply the interpolation rate) will become too great if each parameter consists of a large number of bits. Especially where this technique is used in combination with the first method to achieve transmission of interleaved signals after the coding of error correction, burst errors will be randomized. If the errors are within the error correcting capacity of the apparatus, there will be no problem. But, if errors beyond the capacity are detected by the burst error detecting circuit, there will arise such an awkward situation that, for example, every parameter includes one error bit and therefore must interpolate or replace all the parameters with all the parameters of the preceding frame.

In the conventional system, either the natural binary code or the folded binary code has usually been employed for the binary encoding of the quantized level of parameters. In these coding systems, replacement of only the error bits, or the bits highly likely to be erroneous, with the bits of the respectively preceding frames cannot suffficiently correct these error bits and therefore, deteriorates the quality of the decoded speech signal, which will be described in detail later.

SUMMARY OF THE INVENTION

An object of the present invention, intended to solve the technical problems stated above, is to provide a speech-adaptive predictive coding system capable of reproducing high quality speech signal.

Another object of the present invention is to provide a speech-adaptive predictive coding system employing the reflected binary code for the parameter information of the adaptive predictive coding.

Still another object of the present invention is to provide a speech-adaptive predictive coding system employing the reflected binary code, and error correction and interleaving methods to provide a more high quality speech signal.

According to the invention, there is provided a speech-adaptive predictive coding system including speech-adaptive predictive encoding and decoding apparatuses, wherein the speech-adaptive predictive encoding apparatus comprises: means for dividing a speech signal into fixed frames to provide a framed speech signal; means for extracting a predictor coefficient and residual power from each frame of the framed speech signal; means responsive to the predictor coefficient and residual power from the extracting means for providing a predicted residual sequence from the framed speech signal by an adaptive predictive coding method; means for converting parameter information representing the predictor coefficient and residual power into a reflected binary code; and means for multiplexing the predicted residual sequence and the parameter information sequence converted into the reflected binary code to provide a multiplexed signal sequence, and wherein the speech-adaptive predictive decoding apparatus comprises: means for separating the multiplexed signal sequence into the predicted residual signal sequence and the parameter information sequence; means for detecting burst errors in the multiplexed signal sequence; means for selectively switching between the separated parameter information sequence and delayed sequence in response to the output of the detecting means in order to replace the separated parameter information sequence with the delayed sequence upon detection of said burst sequence; means for delaying the output of the switching means by a prescribed length of time and feeding it back as the delayed sequence to the switching means; means for decoding the output of the switching means to provide a decoded parameter information signal; means for regenerating the predictor coefficient and residual power of the residual signal sequence from the decoded parameter information signal; and means responsive to the regenerated predictor coefficient and residual power for decoding the separated predicted residual signal sequence by an adaptive predictive decoding method to provide a speech signal.

BRIEF DESCRIPTION OF THE DRAWINGS

The foregoing and other objects, features and advantages of the present invention will become more apparent from the detailed description hereunder taken in conjunction with the accompanying drawings, wherein.

DETAILED DESCRIPTION OF THE PREFERRED EMBODIMENTS

The table below shows the relationship between the reflected binary and natural binary codes. The former, also known as Gray code, is usually employed for multi-value transmission of binary information. As can be seen from the table, in the reflected binary code the bit patterns of any two codes corresponding to the adjacent quantized levels differ from each other by only one bit (i.e., the Hamming distance is 1).

For more details on the reflected binary code, reference is made to Hiroshi Inose, *An Introduction to Digital Integrated Communications Systems*, published by UNIVERSITY OF TOKYO PRESS, 1979, pp. 22~23.

TABLE

| Quantization Level | Natural Binary Code | Reflected Binary Code |
|---|---|---|
| 15 | 1111 | 1000 |
| 14 | 1110 | 1001 |
| 13 | 1101 | 1011 |
| 12 | 1100 | 1010 |
| 11 | 1011 | 1110 |
| 10 | 1010 | 1111 |
| 9  | 1001 | 1101 |
| 8  | 1000 | 1100 |
| 7  | 0111 | 0100 |
| 6  | 0110 | 0101 |
| 5  | 0101 | 0111 |
| 4  | 0100 | 0110 |
| 3  | 0011 | 0010 |
| 2  | 0010 | 0011 |
| 1  | 0001 | 0001 |
| 0  | 0000 | 0000 |

The apparatus according to the present invention decodes the parameters for the adaptive predictive decoding using the reflected binary code. The apparatus interpolates with the bits of the respectively preceding frames only those bits which are either definitely erroneous or highly likely to be erroneous without taking into account the divisions between the bits constituting each parameter (hereinafter referred to as bit-by-bit parameter interpolation).

Those bits which are either defintely erroneous or highly likely to hbe erroneous may be determined by a burst error detector which will be described hereinafter. As mentioned above, the reflected binary code does not vary significantly its binary-encoded bit patterns with respect to the quantization levels. As a result, high-quality speech can be restored even over a transmission path with a high error rate.

Figure 2:
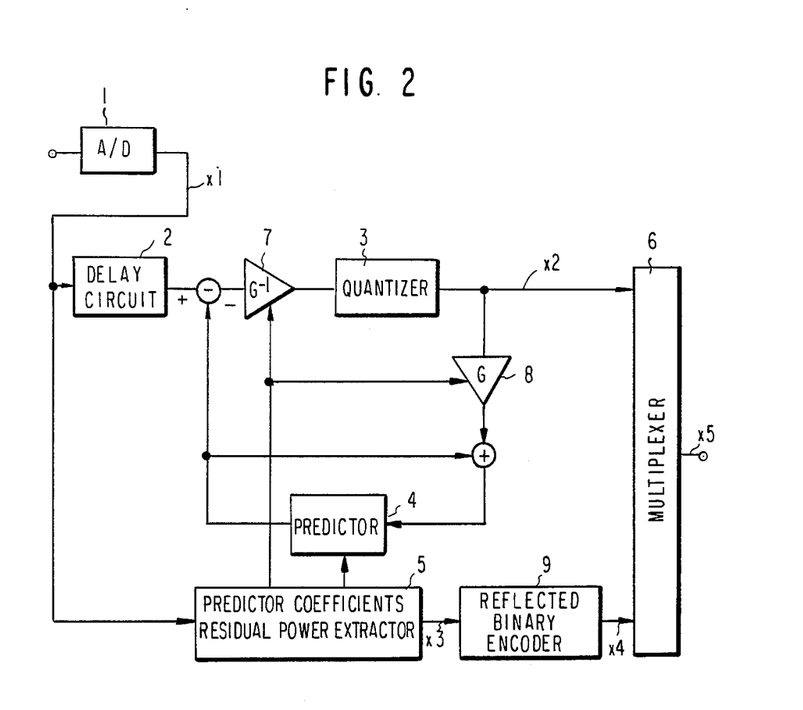
FIG. 2 is a block diagram illustrating a preferred embodiment of the speech encoding apparatus according to the present invention.

Referring now to FIG. 2, the encoding apparatus comprises an analog/digital (A/D) converter 1, a delay circuit 2, a quantizer 3, a predictor 4, a predictor coefficient and residual power (PCRP) extractor circuit 5 and a multiplexer 6. Multiplexer 6 multiplexes a predicted residual bits sequence x2 and a parameter information sequence x3 to provide a multiplexed transmitting bit sequence x5. The apparatus also includes an amplifier 7 having a gain of $G^{-1}$ equal to (residual power)$^{-1}$, another amplifier 8 having a gain of G and a circuit 9 for the reflected binary encoding of parameter information sequence x3, which are the quantization levels of the predictor coefficients and residual power. In FIG. 2, a reference character x1 represents a sampled sequence of a speech signal and x4, a reflected binary-encoded sequence of parameter information bits. The circuits 1 through 8 referred to above are common with speech-adaptive predictive coding apparatus of the prior art, while the reflected binary encoder circuit 9 is a new addition by the present invention. This circuit 9 will output, if for instance the number of quantization bits is four, reflected binary codes in accordance with the foregoing table or, if the number is not four, will also output reflected binary codes in accordance with a similar table. For further details on the speech-adaptive predictive encoding part including the circuits 1 through 8, which is common with similar apparatus of the prior art, reference is made, for example, to Bishnu S. Atal, *"Predictive Coding of Speech at Low Bit Rates"*, in IEEE Transactions on Communications, Vol. COM-30, No. 4, April 1982, pp. 600~614.

Figure 3:
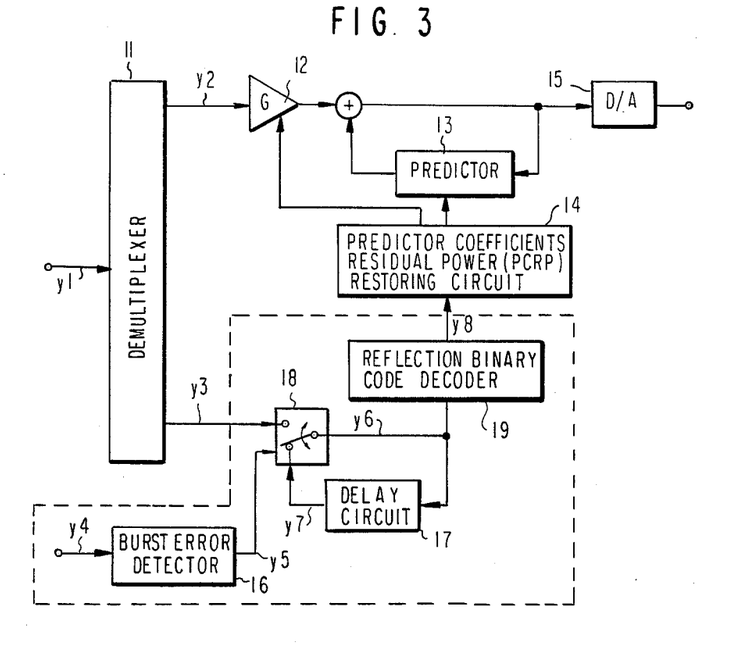
FIG. 3 is a block diagram illustrating a preferred embodiment of the speech decoding apparatus according to the invention.

In FIG. 3, a demultiplexer 11 separates a multiplexed received bit sequence y1 into a predicted residual bit sequence y2 and a parameter information bit sequence y3. The predicted residual bit sequence y2 is amplified by an amplifier 12 adjusted to a gain (G) equal to that of the residual power by a predictor coefficient and residual power (PCRP) restoring circuit 14. The output of this amplifier 12 is added to the output of a predictor circuit 13 which is under the control of the PCRP restoring circuit 14. The added sequence is supplied to a digital/analog (D/A) converter 15, which provides a demodulated speech output. For more details on the speech-adaptive predictive decoding part including the foregoing circuits 11 through 15, which is common with similar apparatus of the prior art, reference is made, for instance, to Atal's paper cited above.

A burst error detector circuit 16 detects any burst error in the received bit sequence y1 with the received signal power or out-band noise power y4, and provides a burst error detection signal y5. A switching circuit 18 selects either the parameter information bit sequence y3 of the current frame or a parameter information bit sequence y7, which was selected one frame before. A delay circuit 17 stores with one frame's lag a parameter information bit sequence y6 selected by the switching circuit 18, and outputs the parameter information bit sequence y7 of the preceding frame. A reflected binary decoder circuit 19 supplies the PCRP restoring circuit 14 with a decoded parameter information signal y8 obtained by the reflected binary decoding of the parameter information bit sequence y6. The foregoing circuits 16 through 19 are new additions by the present invention, intended to keep the speech quality from being adversely affected by any burst error.

The switching circuit 18 achieves bit-by-bit parameter interpolation by selecting the parameter information bit sequence y7 of the preceding frame if a burst error is detected or the parameter information bit sequence y3 of the current frame if no burst error is detected. The operation of this switching circuit 18 will be described below with reference to FIG. 4, of which (A) shows the parameter information bit sequences of the (n−1)-th and n-th frames, where a0, b0 and so on are bits of either "0" or "1".

Figure 4:
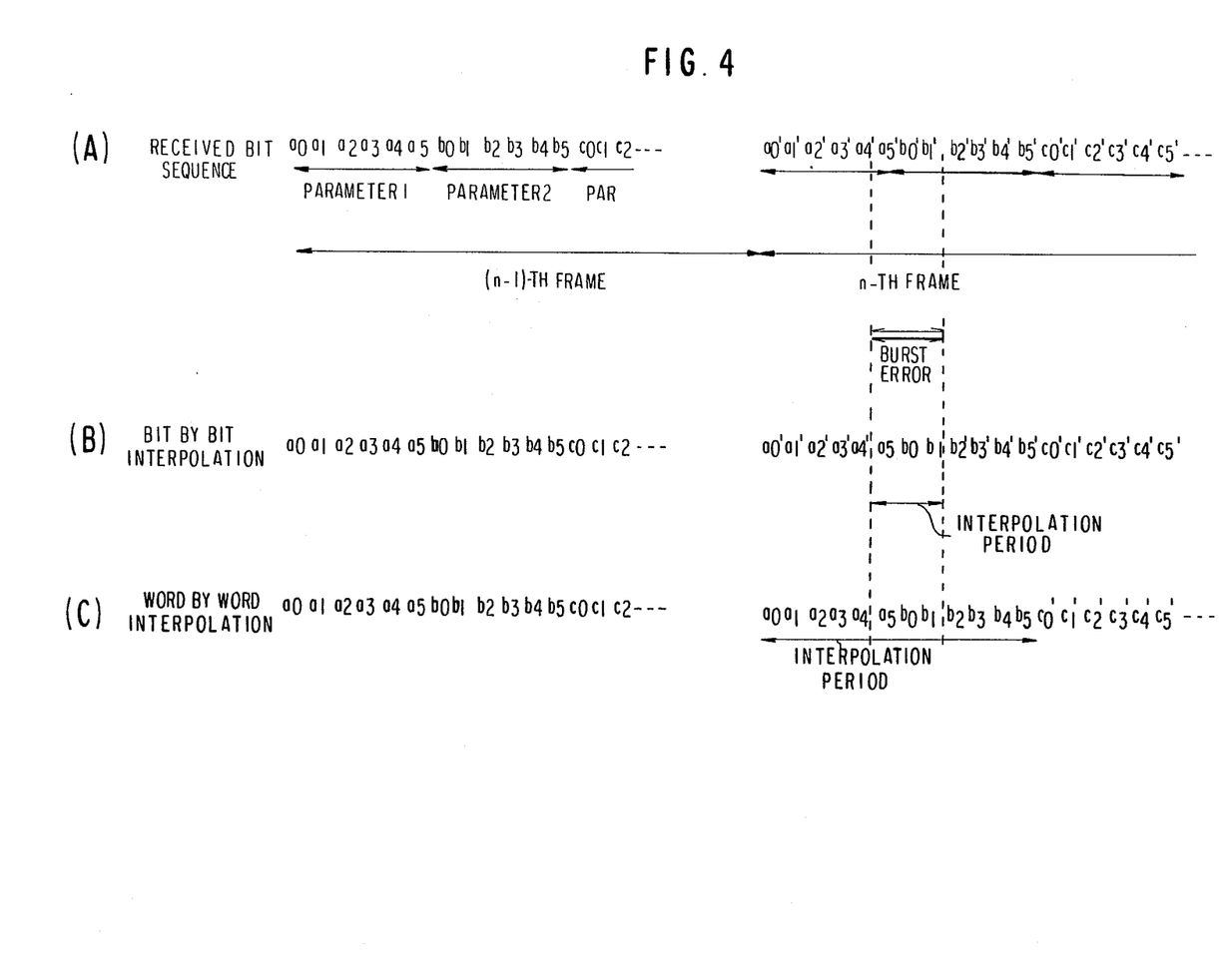
FIG. 4 is a diagram for describing the bit-by-bit parameter interpolation method according to the invention.

In the n-th frame, where no burst error is detected as to its first five bits a0', a1', a2', a3' and a4', the switching circuit 18 selects the parameter information bit sequence y3 and, therefore, provides the received bit sequence as it is. Since a burst error is detected at the next three bits a5', b0' and b1', the switching circuit 18 selects the parameter information sequence y7, and outputs the bits a5, b0, and b1, which are in respectively the same positions in the preceding frame. With no burst error detected at b2', b3' . . . , the switching circuit 18 again selects the parameter information bit sequence y3, and provides the received bit sequence as it is. This bit sequence is shown in FIG. 4(B). The reflected binary decoder circuit 19 performs an operation reverse to the reflected binary encoder circuit 9 of the encoding apparatus, and the output therefrom is the parameter information signal y8, which is the quantized level of the parameters. Meanwhile, by the word-by-word parameter interpolation method referred to earlier, as shown in FIG. 4(C), any error occurring in a given word would necessitate the interpolation of the whole word, involving the problem of an excessive parameter interpolation rate.

Next, the effectiveness of the bit-by-bit parameter interpolation by the reflected binary coding according to the present invention will be described.

The variations of parameters in a constant speech period are not so marked, but they do vary by one level or so as a result of quantization. It is supposed here that the quantization level $q_{n-1}$ is 7 in the (n−1)-th frame and $q_n$ is 8 in the n-th frame. The natural and reflected binary codes for $q_{n-1}=7$ are (0111) and (0100), respectively, and those for $q_n=8$, (1000) and (1100), respectively. The variation of the quantized level from 7 to 8 corresponds to that of the natural binary code from (0111) to (1000), resulting in a wholly different bit pattern, which makes bit-by-bit interpolation impossible. In contrast, the corresponding variation of the reflected binary code is from (0100) to (1100), the latter's bit pattern being identical with the former's except for a single bit. Therefore, with these reflected binary codes, an error in any of the three less significant bits could be corrected by bit-by-bit interpolation to achieve proper decoding of the quantization level. Even if the most significant bit is an error bit, the quantization level $q_n$ after the interpolation will be 7, different from the correct value by only 1, and the difference thus will have no significantly adverse effect.

Figure 5:
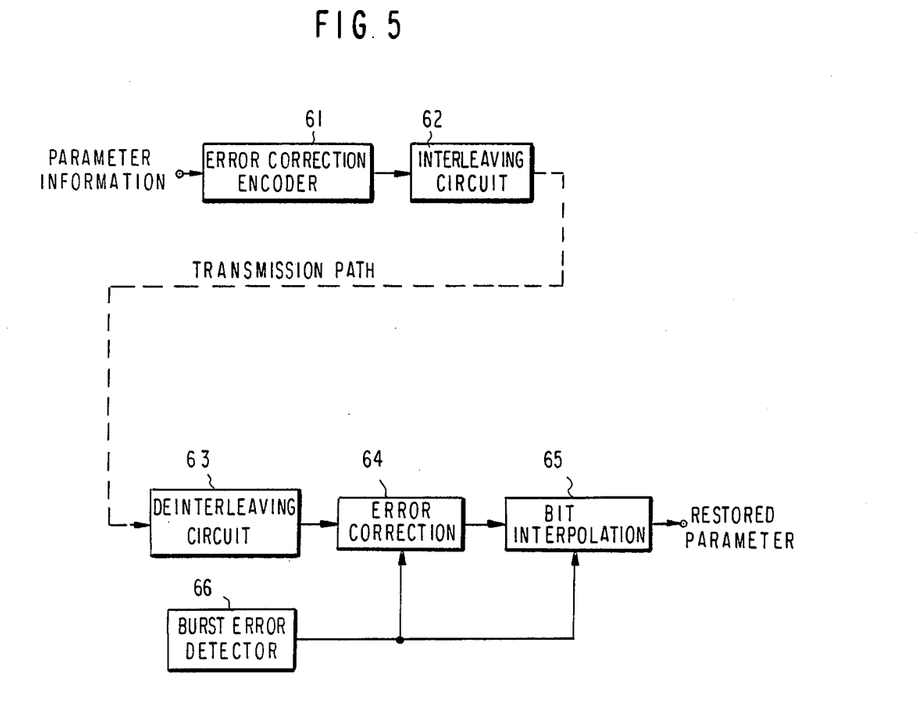
FIG. 5 is a block diagram illustrating another preferred embodiment of the speech encoding/decoding apparatus according to the invention.

A second preferred embodiment of the present invention involves a component to add an error correction code to the parameter sequence in addition to the first embodiment. The block diagram of this second embodiment is illustrated in FIG. 5. In FIG. 5, parameter information, after being converted into a random error correction code by an error correction encoder 61, is interleaved by an interleaving circuit 62 for transmission. A received bit sequence, conversely, is deinterleaved by a deinterleaving circuit 63 before being fed to an error correction circuit 64. If the burst error detected by a burst error detector 66 can be corrected, the sequence will be corrected by this circuit 64, or if it is beyond the correcting capacity of the circuit 64, will undergo bit-by-bit parameter interpolation in a parameter interpolation circuit 65 at the next stage.

Figure 6:
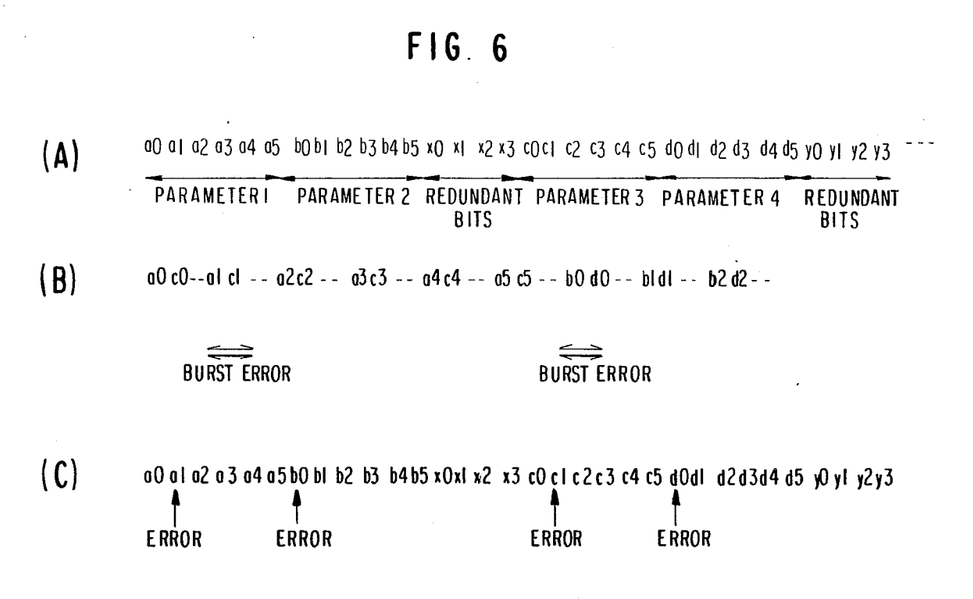
FIG. 6 is a diagram for describing error correction encoding and interleaving by the apparatus illustrated in FIG. 5.

The operation of this second preferred embodiment will be now described in more specific terms with reference to FIG. 6. It is supposed that, as shown in FIG. 6(A), parameters 1 and 2 and parameters 3 and 4 are respectively combined into one block to undergo single-bit error correction encoding. The bit sequence after interleaving is shown in FIG. 6(B) and that after deinterleaving, in FIG. 6(C). Any burst error on the transmission path is randomized by deinterleaving as shown in FIG. 6(C). In this example, two errors are detected in the single block, and there is no guarantee of faultless correction because of single-bit error correction coding. If word-by-word interpolation is performed as referred to earlier, all of parameters 1 through 4 will be interpolated, but the bit-by-bit parameter interpolation according to the present invention would permit the information carried by correct bits to be used as it is.

A third conceivable embodiment would have a waveform interpolating function, described above as the prior art, for burst errors in the residual signal sequence in addition to the first or second preferred embodiment. Although errors in the residual signal sequence affect the speech quality less than do parameter errors and, moreover, this embodiment has the disadvantage of a somewhat complex circuit for pitch period detection, it can be highly effective where the error rate is high.

As hitherto described, the present invention has the advantage of being able to prevent speech quality deterioration owing to burst errors in a speech-adaptive predictive encoding/decoding apparatus without decreasing the transmission efficiency of signals. This is done by adding a circuit for converting parameter information into eflected binary codes and, upon detection of a burst error, achieving bit-by-bit parameter interpolation.

What is claimed is:

1. A speech-adaptive predictive coding system including an encoding apparatus comprising:
   means for dividing a speech signal into fixed frames to provide a framed speech signal;
   means for extracting a predictor coefficient and residual power from each frame of said framed speech signal;
   means responsive to the predictor coefficient and residual power from said extracting means for adaptively, predictively encoding said framed speech signal to provide a predicted residual sequence;
   means for converting parameter information representing said predictor coefficient and residual power into a reflected binary code; and
   means for multiplexing said predicted residual sequence and the parameter information sequence converted into said reflected binary code.

2. A speech-adaptive predictive coding system including a decoding apparatus comprising:
   means for separating a multiplexed bit sequence into a predicted residual sequence and a parameter information sequence encoded into a reflected binary code;
   means for detecting burst errors in said multiplexed bit sequence;

means for selectively switching between said separated parameter information sequence on a bit-by-bit basis and a delayed sequence in response to the output of said detecting means in order to replace said separated parameter information sequence with said delayed sequence upon detection of said burst error;

means for delaying the output of said switching means by a prescribed length of time and feeding it back as said delayed sequence to said switching means;

means for decoding the output of said switching means to provide a decoded parameter information sequence;

means for regenerating the predictor coefficient and residual power from said decoded parameter information sequence; and means responsive to the regenerated predictor coefficient and residual power for adaptively, predictively decoding said separated predicted residual sequence to provide a speech signal.

3. A speech-adaptive predictive coding system, as claimed in claim 2, wherein said prescribed length of time corresponds to one frame in said predicted residual sequence.

4. A speech-adaptive predictive coding system including speech-adaptive predictive encoding and decoding apparatus, wherein said speech-adaptive predictive encoding apparatus comprises:

means for dividing a speech signal into fixed frames to provide a framed speech signal;

means for extracting a predictor coefficient and residual power from each frame of each of said framed speech signal;

means respnsive to the predictor coefficient residual power from said extracting means for adaptively, predictively encoding said framed speech signal to provide a predicted residual sequence;

means for converting parameter information representing said predictor coefficient and residual power into a reflected binary code; and means for multiplexing said predicted residual sequence and the parameter information sequence converted into said reflected binary code to provide a multiplexed signal sequence, and wherein said speech-adaptive predictive decoding apparatus comprises:

means for separating said multiplexed signal sequence into said predicted residual sequence and said parameter information sequence;

means for detecting burst errors in said multiplexed signal sequence;

means for selectively switching between said separated parameter information sequence and a delayed sequence on a bit-to-bit basis in response to the output of said detecting means in order to replace said separated parameter information sequence with said delayed sequence upon detection of said burst error;

means for delaying the output of said switching means by a prescribed length of time and feeding it back as said delayed sequence to said switching means;

means for decoding the output of said switching means to provide a decoded parameter information sequence;

means for regenerating said predictor coefficient and residual power from said decoded parameter information sequence; and means responsive to the regenerated predictor coefficient and residual power for adaptively, predictively decoding said separated predicted residual sequence to provide a speech signal.

5. A speech-adaptive predictive coding system, as claimed in claim 4, wherein said speech-adaptive predictive encoding apparatus further comprises:

error correction encoding means for adding an error correction code to the sequence converted into said reflected binary code; and means for interleaving the output of said error correction encoding means, and wherein said speech-adaptive predictive decoding apparatus further comprises:

means for deinterleaving the separated parameter information sequence; and means for error-correcting the output of said deinterleaving means in response to the output of said detecting means and supplying said switching means with the error-corrected sequence as its input.

6. A speech-adaptive predictive system incuding an error correcting method comprising the steps of:

producing a predicted residual sequence and a parameter information sequence for a speech signal;

converting said parameter information sequence into a reflected binary code;

multiplexing said predicted residual sequence and the reflected binary encoded parameter information sequence into a multiplexed sequence;

transmitting said multiplexed sequence;

separating said transmitted multiplexed sequence into a predictor residual sequence and a reflected binary encoded parameter sequence;

replacing the separated reflected binary encoded parameter sequence on a bit-by-bit basis with a delayed sequence to provide an interpolated sequence if any burst error occurs in said transmitted sequence;

delaying said interpolated sequence by a presciribed length of time to provide said delayed sequence;

decoding said interpolated sequence into a decoded parameter information sequence; and generating a speech signal from said separated predictor residual sequence in response to said decoded parameter information sequence.

7. A speech-adaptive predictive coding system, as claimed in claim 6, wherein said prescribed length of time corresponds to one frame of said predicted residual sequence.

8. A speech-adaptive predictive coding system including an encoding apparatus comprising, means for dividing a speech signal into frame of a fixed time length each, means for quantizing and encoding for each frame the parameter information of the predictor coefficients and of the predictor residual power and the predicted residual sequence, and means for multiplexing the quantized and encoded parameter information and predicted residual sequence, said apparatus further comprising a converter circuit for converting said parameter information into a reflected binary code.

9. A speech-adaptive predictive coding system including a decoding apparatus comprising, means for detecting burst errors in a parameter sequence of reflected binary codes separated form a received sequence, means for delaying said parameter sequence frame by frame, means for selecting either bits contained in the parameter sequence of the current frame or bits contained in the parameter sequence of the delayed preceding frame on a bit-by-bit basis in accordance with the detected result, means for converting the selected parameter sequence of reflected binary codes into the parameter information of the predictor coefficients and of the predictor residual power, and means for decoding a predicted residual sequence separated from said received sequence in response to said parameter information in order to provide a speech signal.

10. A speech-adaptive predictive coding system having an encoding unit and a decoding unit, and using a speech-adaptive predictive coding method, wherein said encoding unit comprises, means for dividing a speech signal into frames of fixed time length each; means for quantizing and encoding for each frame the parameter information of the predictor coefficients and of the predictor residual power and the predicted residual sequence; means for converting the encoded parameter information into a parameter sequence of reflected binary codes; and means for multiplexing and transmitting to said decoding unit said parameter sequence and said predicted residual sequence; and wherein said decoding unit comprises means for detecting burst errors in the parameter sequence separated from the transmitted sequence; means for selecting either bits contained in the parameter sequence of the current frame or bits contained in the parameter sequence of the delayed preceding frame on a bit-by-bit basis in accordance with the detected result; means for converting the selected parameter sequence of reflected binary codes into the parameter information of the predictor coefficients and of the predictor residual power; and means for decoding the transmitted predicted residual sequence in response to the converted parameter information to provide a speech signal.

* * * * *

UNITED STATES PATENT AND TRADEMARK OFFICE
CERTIFICATE OF CORRECTION

PATENT NO. : 4,710,960

DATED : December 1, 1987

INVENTOR(S) : SATO

It is certified that error appears in the above-identified patent and that said Letters Patent is hereby corrected as shown below:

COLUMN 3, LINE 64   Delete "hbe" and insert --be--.

Signed and Sealed this

Second Day of August, 1988

Attest:

Attesting Officer

DONALD J. QUIGG

Commissioner of Patents and Trademarks